United States Patent [19]

Foletta

[11] Patent Number: 4,650,981

[45] Date of Patent: Mar. 17, 1987

[54] CREDIT CARD WITH ACTIVE ELECTRONICS

[76] Inventor: Wayne S. Foletta, 4760 Castlewood Dr., San Jose, Calif. 95129

[21] Appl. No.: 574,483

[22] Filed: Jan. 26, 1984

[51] Int. Cl.$^4$ .............................................. G06K 7/08
[52] U.S. Cl. ..................... 235/449; 235/380; 235/492; 235/493; 340/825.33
[58] Field of Search ............... 235/379, 380, 492, 449, 235/493; 343/6.8 R, 6.8 LC; 340/572

[56] References Cited

U.S. PATENT DOCUMENTS

| | | | |
|---|---|---|---|
| 4,075,632 | 2/1978 | Baldwin et al. | 343/6.8 R |
| 4,277,837 | 7/1981 | Stuckert | 235/380 |
| 4,333,072 | 6/1982 | Beigel | 340/572 X |
| 4,473,825 | 9/1984 | Walton | 235/380 X |
| 4,506,148 | 3/1985 | Berthold et al. | 235/380 |

Primary Examiner—David L. Trafton

[57] ABSTRACT

A telecard including active devices to provide communications between the active devices and a card reader without the need for electromechanical interconnection. The active devices include logic processing and data storage modules that are accessed by the application of power thereto via electromagnetic coupling. Data transferred into and out of the active devices are provided by baseband current loop modulation and demodulation. A separate card reader and telecard are provided, the telecard comprising a plastic card within which is sandwiched an integrated circuit powered by an electromagnetic loop formed upon the integrated circuit substrate. The card reader is configured to exchange data by inductive coupling with the telecard and provides direct connection to a telephone line.

26 Claims, 3 Drawing Figures

CREDIT CARD WITH ACTIVE ELECTRONICS

BACKGROUND OF THE INVENTION

1. Field of the Invention

The present invention relates to the credit card industry. More particularly, the present invention relates to an interactive credit card including intelligent circuitry and read/write data storage.

2. Description of the Prior Art

Credit cards were initially an embossed metal plate used to address bills to a customer at the time of a purchase. Credit cards have evolved to the now standard magnetic strip card, such as used by Bank of America (VISA). The relative ease with which magnetic strip credit cards can be illegally manufactured and distributed have made them the target of increasing criminal activity.

The banking industry is suffering large losses due to the fraudulent use of credit cards. The losses are increasing at such a rate that the use of magnetic strip credit cards may be stopped by some institutions. There has been considerable research by organizations such as Battelle, SRI, Malco, and others to solve such problems that relate to the use and misuse of magnetic strip credit cards.

One approach is to encode optical information in the form of a hologram onto the card's surface to store significantly more information than present magnetic strips allow. The optically encoded information is not alterable or readily readable without expensive equipment. In contrast, magnetic strip cards are readily altered and read by simple audio recording equipment. A disadvantage of the optical card is that it is a static memory device that may not be written to and that contains no "intelligence" for performing calculations or carrying account values and alterable passwords.

Another proposed solution to the problem of credit card fraud is to install an integrated circuit into a credit card substrate. Such a circuit might include a microprocessor and a memory area, viz. a microcomputer system on a credit card. Experimental cards of this type are in use in France and are manufactured by companies such as CII-Honeywell Bull and Philips. Such cards are often unreliable, in large part due to the need for metallic contacts to couple the card to a card reader. Such contacts are readily tarnished, have a short useful life, and require a precision card reading mechanism. The circuitry within the card is produced according to CMOS integrated circuit technology. As a result, cards containing such circuitry are often damaged by static electricity transferred to the circuitry by the metallic contacts. Such cards are expensive to manufacture, requiring complicated multiple bonding and encapsulating steps. Additionally, connections between the contacts and the circuit within the card are easily broken by flexing of the card, e.g. within the pocket of the card user.

SUMMARY OF THE INVENTION

In the present invention, active devices are embedded into a credit card substrate. Communication between the active devices and a card reader is provided without the need for electromechanical interconnection, as is provided by the prior art metallic contacts. The invention is a "smart" credit card that is accessed by a novel means of applying power through electromagnetic couplings and by transferring information into and out of the active devices by baseband current loop modulation and demodulation.

The present invention includes a card reader and a telecard. The telecard is a plastic card, within which is sandwiched an integrated circuit powered by an electromagnetic loop. In some embodiments of the invention, the loop itself may or may not be on the surface of the integrated circuit, although the present invention solves the problem of locating an inductive loop onto an integrated circuit substrate.

The card reader includes a standard telephone subscriber circuit, and a telecard power source and data modulator/demodulator, which are connected to the subscriber circuit. The standard telephone subscriber circuit converts two wire information (for example, to and from a bank) to four wire signals (data in, data out). The data modulator/demodulator converts the four wire information back to a two wire format to modulate the power source connected to the subscriber circuit. An inductive loop supplies energy and information to the telecard through an air gap.

In operation, the telecard is placed in the card reader. The card reader inductive loop is aligned with a telecard inductive loop to couple energy across the air gap without power loss. Such alignment is significantly less critical than the positioning of electromechanical contacts in prior art devices.

The telecard includes a telecard inductive loop, rectifier, data modulator, shunt regulator, data demodulator, system logic, and memory. The telecard inductive loop receives power and data from the card reader by inductive transfer across the air gap. The telecard inductive loop may be part of a metalized carrier to which the active devices have been attached, or it may be constructed around the perimeter of an integrated circuit with standard aluminum metallization. The active devices are all integrated onto one integrated circuit substrate in the preferred embodiment of the invention.

The voltage rectifier is used to convert a baseband power waveform coupled from the card reader to the telecard to a DC voltage to power other telecard active devices.

The data modulator is a low current modulator controlled by data output from the system logic. Modulator induced variations in load current are coupled across the air gap to the card reader. Data output is provided in a serial format including synchronizing and parity bits. The data output may include information about the card user as stored in an electrically alterable memory, information about the bank or for the bank, as stored in an electrically programmed memory which is programmed by the bank, and card identification information which may be provided by the card manufacturer.

The shunt voltage regulator has a constant input current and provides a constant output voltage. High input impedance associated with the regulator serves to isolate logic supply load current variations from the card loop load and does not load the input data signals.

The data demodulator separates the input data signals from the baseband power signal. Demodulated data are thereafter coupled to the system logic for processing in accordance with a system logic operating system.

Serial input data start the system logic sequence and also update bank data present in the bank data base, or card user data present in the telecard. For example, the telecard may contain account balance information in much the same way as a checkbook register. At any given time, a bank statement may be produced from information stored in the telecard. Additionally, a user may readily change telecard password information on a systemwide basis by reprogramming the card's password. When a stolen card is reported, a systemwide password change is automatically provided to invalidate the stolen card. The system may also provide an alarm when an attempt is made to use a stolen card and thereby notify a police agency of such use.

The present invention provides higher security for merchants and banks, higher readability and reliability of data on the cards, and increased memory space for storing information. Magnetic strips store 255 bits of information; the present invention stores 1–10K bits of information or more. The present invention is more rugged than magnetic strip cards because there is no mechanical wear or contact. The present invention is also reliable in terms of providing a secure write capability between the card and the bank or credit agency.

DETAILED DESCRIPTION OF A PREFERRED EMBODIMENT

The present invention provides a telecard and card reader combination for transferring financial, credit transaction, or other information between the telecard and an institution data base. The telecard is a self-powered device, including an integrated circuit communications and data base management system operable for bidirectional communications with the card reader and powered by inductive coupling between the telecard and the card reader.

Figure 1:
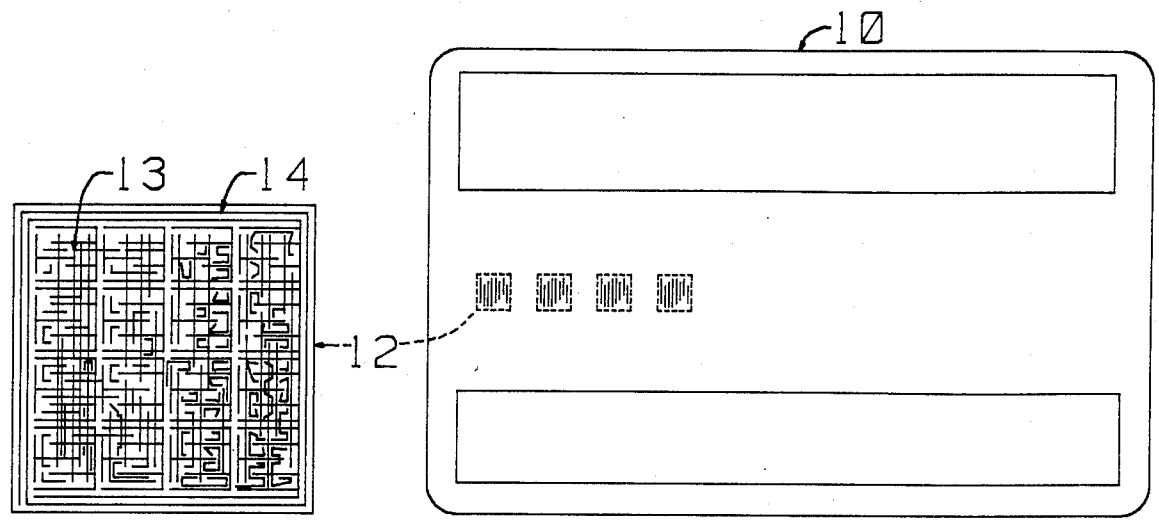
FIG. 1 is a top plan view of a telecard providing a magnified view of a telecard integrated circuit in relation to the telecard.

FIG. 1 shows a telecard 10 including an integrated circuit 12 embedded therein. In actual production, the integrated circuit is somewhat smaller in relation to the card than shown in the Figure. A magnified view of integrated circuit 12 is provided wherein the various integrated circuit components 13 are shown including an inductive loop 14 formed about the perimeter of the integrated circuit substrate. Power is transferred to operate the telecard from the card reader via inductive loop 14. In some embodiments of the invention, inductive loop 14 may be provided off-chip, embedded in the card itself. In the preferred embodiment of the invention, inductive loop 14 is provided on-chip to reduce production cost and improve reliability by eliminating interconnections between the integrated circuit and inductive loop 14.

Inductive loop 14 is preferably an aluminum trace about the perimeter of the integrated circuit substrate having an approximately 10 micron spacing between the loop "windings". Long interconnecting lines running between active components on the integrated circuit are crisscrossed to prevent inductive field pickup from inductive loop 16 that may interfere with telecard operation.

Figure 2:
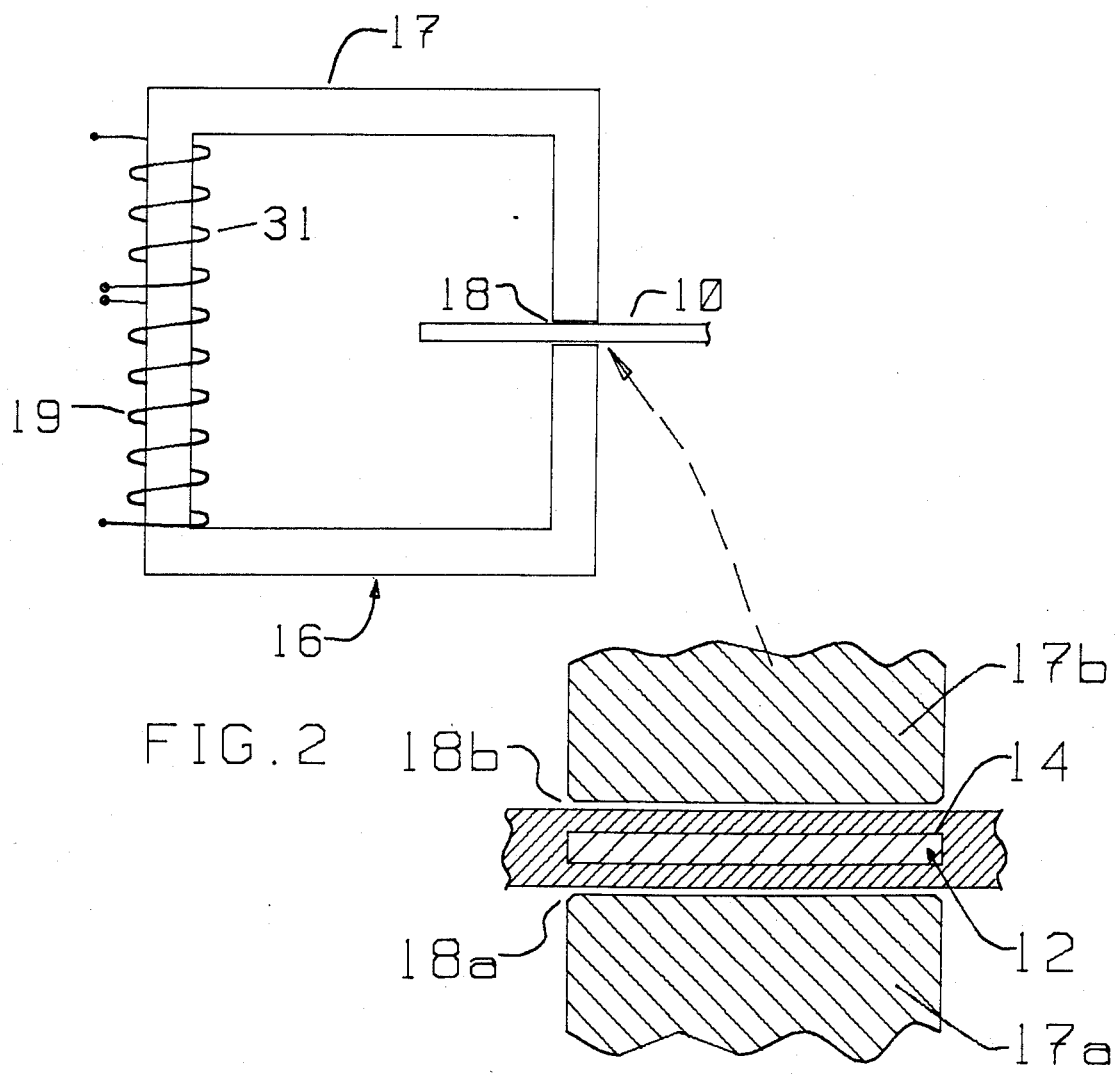
FIG. 2 is a side view and magnified cross section of a telecard and card reader showing inductive coupling therebetween.

FIG. 2 is a side view showing a plastic telecard 10 inductively coupled to a card reader inductive loop 16. In the magnified cross-sectional portion of FIG. 2, integrated circuit 12 is shown positioned within an air gap 18 of an iron core 17, including core portions 17a and 17b. Accordingly, there is an inductive transfer of energy between the integrated circuit and card reader inductive loop 16. Iron core 17 is driven by a winding 19.

In the preferred embodiment of the invention, air gap 18 is formed to allow telecard 10 to be placed therein for inductive bidirectional transfer of information and energy between the telecard and the subscriber set. In some embodiments of the invention iron core 17 is provided in a horseshoe shape to provide energy transfer across the surface of the telecard. This embodiment is provided as an alternative to the cross-sectional transfer of energy provided by the exemplary embodiment of the invention discussed herein. One advantage of a surface card reader is the elimination of card slots and acceptance mechanisms. Card alignment becomes trivial in such embodiments of the invention and card reader maintenance is significantly reduced.

Figure 3:
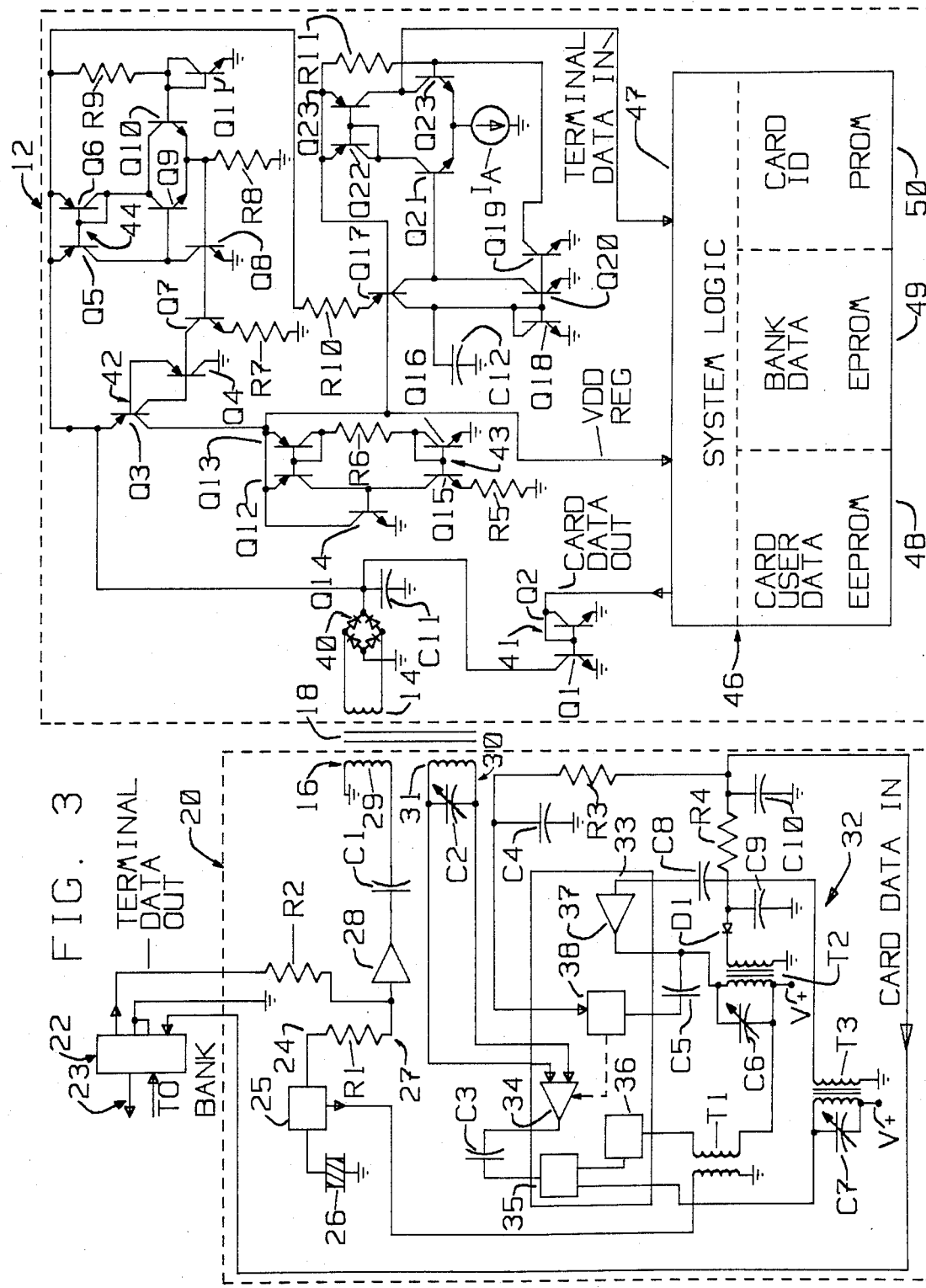
FIG. 3 is a simplified schematic diagram of a preferred embodiment of the present invention.

FIG. 3 is a simplified schematic diagram of a preferred embodiment of the present invention. A telecard integrated circuit 12 is shown coupled to a card reader 20 via air gap 18. Card reader 20 provides data in and data out terminal connections to a telephone subscriber circuit 22 which is thereafter coupled to provide two wire data communications over phone lines 23 or a data network to a central data base computer. In some embodiments of the invention, communications may be with a dark base management system for inventory or transaction control, rather than banking or credit purposes. Significantly, the important aspect of communications between the card reader and the central data base is that data transfer is provided in two directions between the central data base and the card reader. The manner in which data are transferred from the card reader to the central data base is a matter of choice, depending on the application to which the present invention is put.

A card power supply/terminal data modulator 24 is shown including an oscillator 25 driven by a crystal 26 and providing a carrier/power signal through resistor R1 to a summing node 27. In some embodiments of the invention, the oscillator/crystal combination may be replaced by a central computer clock signal.

Data output from a central data base computer is coupled through a resistor R2 to summing node 27. The power and data signals present at summing node 27 are coupled to an input of a linear transconductance amplifier 28. The output of which is thereafter coupled through a coupling capacitor C1 to a power/data modulator inductor 29.

The signal provided to inductor 29 is propagated across an air gap 18 and inductively coupled to telecard inductor 14. The signal received at telecard inductor 14 is rectified by a bridge rectifier 40 and filtered by a capacitor 11. The signal thus developed is a pulsating direct current signal that is coupled to a current source circuit 42 consisting of transistors Q3 and Q4.

Upon telecard initialization, the pulsating direct current signal is also coupled to a starter circuit 44 which includes a differential current source consisting of transistors Q5 and Q6 and transistors Q9 and Q10. A voltage developed across resistor R9 in conjunction with current sink transistor Q11 operates the differential transistor pairs and causes transistor Q7 to conduct. A voltage drop is produced across resistor R7 which in turn operates current source transistor Q4.

A corresponding current developed by transistor Q3 is provided to voltage regulator circuit 43. Voltage regulator circuit 43 consists of transistors Q12–Q16 and a resistor R5. A voltage $V_{DD}$ is accordingly current and voltage regulated to supply a precision power source to operate the telecard.

Current source 42 is a high impedance load on the pulsating DC signal such that data carried by the signal are not loaded by the current source or voltage regulator. A resulting data bit stream is coupled through a resistor R10 to data demodulator circuit 45. The data bit stream operates a transistor Q17 to produce a differential output from differential transistor pair Q18 and Q20. An output signal is coupled to the base of a transistor Q21 which is part of a differential transistor pair Q21 and Q24. Current source $I_4$ and differential transistor pair Q22 and Q23 operate to produce a terminal data in demodulated signal at the collector of transistor Q24.

The terminal data in signal received and demodulated at the telecard is coupled to a system circuit 46 which includes a system logic component 47 that may be a microprocessor and associated latching addressing and timing circuits. The terminal data signal in is thereafter used to write to or read from various memory components of the system circuit.

FIG. 3 shows a card user data $E^2$PROM 48, a bank data EPROM 49, and a card ID PROM 50. Memory allocation may be varied in different embodiments of the invention, although the preferred embodiment of the invention provides a card user space, a bank space, and a permanent card ID space.

The telecard includes a nonvolatile random access memory, such as a floating gate avalanche and injection metal oxide semiconductor ($E^2$RAM), to allow telecard read and write capability while maintaining memory content integrity in the absence of a continuous power supply, for example, when the telecard is removed from the card reader. $E^2$RAM devices are presently available from Zicor of Milpitas, Calif. and Intel of Santa Clara, Calif., among other manufacturers.

Telecard memory space provides read/write capability and includes 10Kb of RAM memory and 3Kb of ROM memory, including the telecard operating system. The operating system controls communications and memory access and storage. Other embodiments of the invention include such features as password verification, write protect, account balance and total, and simple computational tasks. The telecard may also be used as a universal identification card for storing and accessing vital information in an easily updated format.

The system logic produces a card data out signal in accordance with a logic operating system. The data out signal is coupled to a data modulator circuit 41 that includes a differential transistor pair Q1 and Q2. The collector of transistor Q1 loads card inductor loop 14 in response to the data out signal.

The varying load produced by card inductor loop 14 is sensed in the card reader by a tuned circuit 30 consisting of an inductor 31 and a variable capacitor C2. Varying load conditions produced by transistor Q1 do not affect telecard power supply operation because a high impedance current source drives the regulator circuit.

Telecard data received at tuned circuit 30 is coupled to a receiver 33. A differential signal produced at tuned circuit 30 is coupled to the differential inputs of RF amplifier 34. The output of RF amplifier 34 is coupled through a capacitor C3 to a superheterodyne mixer circuit 35. The mixer also receives a baseband signal from baseband oscillator 36. In the preferred embodiment, baseband oscillator 36 is driven by a signal output from oscillator 25 and coupled thereto by a transformer T1.

The output of mixer 35 is coupled to a data detector circuit 32 that includes a tuned stage consisting of a variable capacitor C7 and a transformer T3. A signal thus induced in the secondary of transformer T3 is coupled through a capacitor C8 to an intermediate frequency (IF) amplifier 37. A portion of the signal produced by the IF amplifier is coupled through a capacitor C5 to an automatic gain control (AGC) amplifier circuit 38 to maintain a constant data level and thus insure reliable data transfer. The output of IF amplifier 37 is also coupled through a tuned circuit consisting of a variable capacitor C6 and a transformer T2. A signal induced in the secondary of transformer T2 is coupled to a detector diode D1 and thereafter through a resistor R4 to provide a data bit stream output signal (card data in).

Communications between the card reader and the telecard are via baseband transmission. In the preferred embodiment, the power source is a 1-MHz carrier frequency; while data are provided at 100-kHz. Data transmission is via an ASCII serial bit stream of 8-bit words that include a parity bit. Data transmission rates may be 300–1200 baud. These rates are tied to conventional telephone line rates and communications protocol at the card reader to eliminate the need for buffers or modems when telephone line connections are established. In some embodiments of the invention, telephone lines are not used to access the central computer. However, the telecard is readily presented at any number of local terminals in a data base network.

The system logic in the preferred embodiment provides half duplex communications between the telecard and the card reader. Thus, the telecard cannot receive data while it is transmitting and vice versa. Other embodiments of the invention may have a full duplex communications protocol, in which case another inductor winding is added to telecard inductor 14. The preferred embodiment of the invention provides reliable and high speed data bidirectional transfer without the need and expense of additional inductor windings and accompanying circuitry.

The card reader is preferably radio frequency interference (RFI) shielded. Filtering is provided to prevent RFI and power line noise interference when the card is being read or written. The nature of the inductor integrated onto the telecard integrated circuit is such that the card is not sensitive to magnetic fields as are conventional magnetic strip credit cards.

The present invention provides a computer on a card that is self-powered by a card reader. The card is reliable and inexpensive, and capable of running sophisticated internal programs to prevent unauthorized access to credit information and to prevent unauthorized transactions. Some functions other embodiments of the invention may feature include: data word length and transmission rates may be varied as desired. Additionally, power source baseband and data transmission frequencies may be altered. Half duplex communications provided by the present invention may be replaced with full duplex communications by using two separate baseband frequencies. Additionally, instead of amplitude modulation or base band modulation, FM modulation may be provided to improve transmission signal-to-noise ratios.

What is claimed is:

1. A data card for transferring data to a card reader comprising:
   a card body;
   memory means for storing data on an integrated semiconductor chip imbedded in said card body;
   an inductive loop on said chip coupled to said memory means and adapted to transfer data to said card reader through inductive coupling of electromagnetic energy;
   a power supply circuit coupled to said inductive loop for providing power to said memory means from a power signal provided to said inductive loop from said card reader; and
   a circuit means on said chip for transferring data from said memory means to said card reader through said inductive loop.

2. The card of claim 1, further comprising communications means for alternately receiving an input data signal and generating an output data signal according to a half duplex protocol.

3. The card of claim 1, wherein said induced power signal comprises a baseband signal.

4. The card of claim 1, said memory means comprising:
   a card user data storage portion;
   an institution data storage portion; and
   a card identification portion.

5. The card of claim 4, said memory means further comprising a non-volatile random access memory.

6. The card of claim 1, said inductor oriented to receive said induced power signal in an alignment substantially perpendicular to a card surface plane.

7. The card of claim 1, said inductor oriented to receive said induced power signal in an alignment substantially along a card surface plane.

8. The data card of claim 1 wherein a plurality of interconnecting lines between active components on said chip are crisscrossed to prevent inductive field pickup from said inductive loop.

9. The data card of claim 1 wherein said inductive loop is located around the perimeter of said chip.

10. The data card of claim 1 further comprising means for receiving an input signal from said inductive loop.

11. The data card of claim 10 wherein said power supply circuit includes an active shunt regulator having a high input impedance so that said input signal to said receiving means is not significantly loaded by said power supply circuit.

12. An interactive data card having active electronics formed on an integrated circuit substrate, comprising:
   an inductor, formed upon said integrated circuit substrate, coupled to receive an induced power signal and an accompanying input data signal;
   a power source, coupled to said inductor, for operating said data card with said induced power signal;
   data demodulator means, coupled to receive said accompanying data signal, for producing an input data bit stream in accordance therewith;
   non-volatile random access memory means for storing data and instructions at discrete memory locations and including a card user data storage portion, an institution data storage portion, and a card identification portion;
   logic means, coupled to receive said input data bit stream, for reading and writing said memory locations in accordance therewith and in response to accessed instructions within said memory, and for producing an output data bit stream in accordance therewith;
   data modulator means, coupled to said inductor, for generating an output data signal from said output data bit stream by imposing a corresponding varying load condition upon said induced power signal; and
   communications means, for alternately receiving said input data signal and generating said output data signal according to a half duplex protocol and under control of said logic means.

13. An integrated circuit for an interactive data card, comprising:
   an inductor, formed upon said integrated circuit substrate, coupled to receive an induced power signal and an accompanying data signal;
   a power source, coupled to said inductor, for operating said integrated circuit with said induced power signal;
   demodulator means, coupled to receive said accompanying data signal, for producing an input data bit stream in accordance therewith;
   memory means for storing data and instructions at discrete memory locations;
   logic means, coupled to receive said input data bit stream, for reading and writing said memory locations in accordance therewith and in response to accessed instructions within said memory, and for producing an output data bit stream in accordance therewith; and
   modulator means, coupled to said inductor, for generating an output data signal from said output data bit stream by imposing a corresponding varying load condition upon said induced power signal.

14. An interactive data card reader, comprising:
   means for generating a power signal;
   an inductor, coupled to receive said power signal, for producing an induced power signal in accordance therewith;
   data modulator means, coupled to said inductor, for generating an output data signal to accompany said power signal; and
   data demodulator means, coupled to said inductor to receive a data input signal imposed upon said inductor by a corresponding varying load condition upon said induced power signal.

15. The reader of claim 14, wherein said power signal comprises a baseband signal.

16. The reader of claim 14, further comprising:
   means for alternately receiving said input data signal and generating said output data signal according to a half duplex protocol.

17. The reader of claim 14, further comprising means for coupling said data modulator means and data demodulator means to a telephone line for exchange of data therebetween.

18. The reader of claim 14, said inductor adapted to be oriented to induce said power signal in an alignment substantially perpendicular to a data card surface plane.

19. The reader of claim 14, said inductor adapted to be oriented to induce said power signal in an alignment substantially along a data card surface plane.

20. An interactive data card reader, comprising:
   an oscillator for producing a baseband power signal;
   an inductor, coupled to said oscillator, adapted for inducing a power signal in a data card;

a modulator, including a summing node, for producing an input data signal at said summing node to accompany said induced power signal;

a receiver, coupled to said inductor, adapted for detecting a varying load condition upon said induced power signal corresponding to an output data bit stream produced by said data card.

21. The reader of claim 20, wherein said receiver is a superheterodyne receiver.

22. An interactive data card system, comprising:
an interactive data card, including:
  (a) a card inductor coupled to receive an induced power signal and an accompanying input data signal;
  (b) a power source coupled to said card inductor for operating said data card with said induced power signal;
  (c) data demodulator means, coupled to receive said accompanying data signal for producing an input data bit stream in accordance therewith;
  (d) memory means for storing data and instructions at discrete memory locations;
  (e) logic means, coupled to receive said input data bit stream, for reading and writing said memory locations in accordance therewith and in response to accessed instructions within said memory, and for producing an output data bit stream in accordance therewith; and
  (f) data modulator means, coupled to said card inductor, for generating an output data signal from said output data bit stream by imposing a corresponding varying load condition upon said induced power signal; and
an interactive data card reader, including:
  (a) means for generating a baseband power signal;
  (b) a reader inductor coupled to receive said power signal and for producing said induced power signal therefrom;
  (c) data modulator means, coupled to said reader inductor, for generating said input data signal; and
  (d) data demodulator means, coupled to receive said output data signal as a varying load condition upon said induced power signal and for producing an output data bit stream in accordance therewith.

23. A data card for transferring data to a card reader comprising:
a card body;
memory means for storing data on an integrated semiconductor chip imbedded in said card body;
an inductive loop on said chip coupled to said memory means and adapted to transfer data to said card reader through inductive coupling of electromagnetic energy;
means for receiving an input signal from said inductive loop;
a power supply circuit coupled to said inductive loop for providing power to said memory means from a power signal provided to said inductive loop from said card reader; said power supply circuit including an active shunt regulator having a high input impedance so that said input signal to said receiving means is not significantly loaded by said power supply circuit;
a circuit means on said chip for transferring data from said memory means to said card reader through said inductive loop.

24. A data card reader for receiving data from a data card, comprising:
an inductive loop having a winding and a core, said core having a gap therein for receiving a card;
means, coupled to said winding, for receiving a data signal from said card through inductive coupling of electromagnetic energy.

25. The data card reader of claim 24 further comprising a second winding around said core and means, coupled to said second winding, for providing power to said card through inductive coupling of electromagnetic energy.

26. The data card reader of claim 24 wherein said gap in said core is formed by a horseshoe shape of said core.

* * * * *